US006415857B1

United States Patent
Nakamura et al.

(10) Patent No.: US 6,415,857 B1
(45) Date of Patent: Jul. 9, 2002

(54) VEHICLE AIR CONDITIONER WITH FRONT AND REAR FOOT AIR OUTLETS

(75) Inventors: Takeshi Nakamura, Anjo; Tatsuo Tsunooka; Hiroshi Kanda, both of Kariya; Nobuyasu Naito, Obu, all of (JP)

(73) Assignee: DENSO Corporation, Kariya (JP)

( * ) Notice: Subject to any disclaimer, the term of this patent is extended or adjusted under 35 U.S.C. 154(b) by 18 days.

(21) Appl. No.: 09/618,111

(22) Filed: Jul. 17, 2000

(30) Foreign Application Priority Data

Aug. 17, 1999 (JP) .......................... 11-230796

(51) Int. Cl.⁷ ............................. B60H 1/00
(52) U.S. Cl. .................... 165/204; 165/42; 454/69; 454/161; 454/162
(58) Field of Search .................. 165/41, 42, 43, 165/201, 202, 203, 204; 454/69, 161, 162

(56) References Cited

U.S. PATENT DOCUMENTS

| 4,718,244 A | * | 1/1988 | Kobayashi |
| 5,042,566 A | * | 8/1991 | Hildebrand .............. 165/42 |
| 5,062,352 A | * | 11/1991 | Ostrand ............... 165/42 X |
| 5,181,553 A | * | 1/1993 | Doi .................. 165/42 X |
| 5,190,096 A | * | 3/1993 | Taniguchi et al. ........ 165/42 X |
| 5,632,372 A | * | 5/1997 | Higashihara |
| 6,021,957 A | * | 2/2000 | Takechi et al. .......... 165/42 X |
| 6,059,018 A | * | 5/2000 | Yoshinori et al. ........... 165/42 |
| 6,138,749 A | * | 10/2000 | Kawai et al. .............. 165/204 |
| 6,244,335 B1 | * | 6/2001 | Nakamura et al. ......... 165/203 |

FOREIGN PATENT DOCUMENTS

| JP | A-61-24612 | | 2/1986 |
| JP | Y2-4-35207 | | 8/1992 |
| JP | 10-35251 | * | 2/1998 |
| JP | 11-48753 | * | 2/1999 |

* cited by examiner

*Primary Examiner*—Ljiljana Ciric
(74) *Attorney, Agent, or Firm*—Harness, Dickey & Pierce, PLC

(57) ABSTRACT

In a vehicle air conditioner, an air conditioning case has a first front foot air outlet from which air is blown toward a front-seat foot area of a passenger compartment, and a rear foot passage for introducing air toward a rear-seat foot area of the passenger compartment. A rear foot air outlet is provided at a most downstream end of the rear foot passage, and a second front foot air outlet from which air is blown toward the front-seat foot area is provided in the rear foot passage at a position adjacent to the first front foot air outlet. Thus, a ratio between an air amount blown toward the front-seat foot area and an air amount blown toward the rear-seat foot area is readily adjusted by changing an opening area of the second foot air outlet.

14 Claims, 2 Drawing Sheets

VEHICLE AIR CONDITIONER WITH FRONT AND REAR FOOT AIR OUTLETS

CROSS-REFERENCE TO RELATED APPLICATION

This application is related to and claims priority from Japanese Patent Applications No. Hei. 11-230796 filed on Aug. 17, 1999, the contents of which are hereby incorporated by reference.

BACKGROUND OF THE INVENTION

1. Field of the Invention

The present invention relates to a vehicle air conditioner having a front foot air outlet for blowing air toward a front foot area of a passenger compartment and a rear foot air outlet for blowing air toward a rear foot area of the passenger compartment. In the vehicle air conditioner, a ratio between an air amount blown toward the front foot area and an air amount blown toward the rear foot area is possible to be adjusted.

2. Description of Related Art

In a conventional vehicle air conditioner, an air amount blown toward a front foot area is generally set to be larger than an air amount blown toward a rear foot area so that air-conditioning performance for a front seat side of the passenger compartment is improved preferentially. For adjusting the air amount blown toward the rear foot area, a guide plate for restricting an air flow is provided at an inlet portion of a rear foot passage. However, in this case, because an air passage resistance is increased due to the guide plate, an entire air amount blown toward the front and rear foot areas becomes smaller, and heating capacity of the passenger compartment is decreased. Further, by an air flow disturbance due to the guide plate, air-blowing noise may be increased.

For increasing the entire air amount blown toward the front and rear foot areas, an opening area of a front air outlet may be simply increased. However, actually, the shapes of front and rear air outlets are determined from a vehicle structure, and are difficult to be changed.

SUMMARY OF THE INVENTION

In view of the foregoing problems, it is an object of the present invention to provide a vehicle air conditioner in which a ratio between an air amount blown toward a front foot area and an air amount blown toward a rear foot area is simply adjusted.

According to the present invention, in a vehicle air conditioner, an air passage of an air conditioning case has an upstream foot passage and a downstream foot passage which are provided at a downstream air side of a heating heat exchanger in such a manner that the downstream foot passage directly communicate with the upstream foot passage at a downstream side of the upstream foot passage. The air conditioning case has a first front foot air outlet communicating with the upstream foot passage, a second front foot air outlet communicating with the downstream foot passage and being provided at a position adjacent to the first front foot air outlet, and a rear foot air outlet provided at a most downstream position of the downstream foot passage. Further, the second front foot passage is provided in such a manner that air is always blown from the second front foot air outlet when air is blown from the first front foot air outlet. Thus, warm air flowing into the downstream foot passage is branched into an air flow toward the rear foot air outlet and an air flow toward the second front foot air outlet, to be blown toward a front lower side and a rear lower side of a passenger compartment. Accordingly, by adjusting an opening area of the second front foot air outlet, a ratio between an entire air amount blown toward the front lower side and an air amount blown toward the rear lower side can be readily adjusted. Further, when the opening area of the second front foot air outlet is adjusted, only the ratio of the air amount blown toward the rear foot area is changed, but an air flow resistance in the foot passage is not increased. As a result, even when the opening area of the second front foot air outlet is changed, an entire air amount blown into the passenger compartment from the first and second front foot air outlets and the rear foot air outlet is not changed, and heating capacity for the passenger compartment is maintained. Further, because the air flow resistance in the foot passage is not increased, it can prevent air-blowing noise from being reduced. Due to the second front foot air outlet, the air amount blown toward the front lower side is readily increased.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

A preferred embodiment of the present invention will be described hereinafter with reference to the accompanying drawings. In the embodiment, the present invention is typically applied to a vehicle having a left steering wheel.

Figure 1:
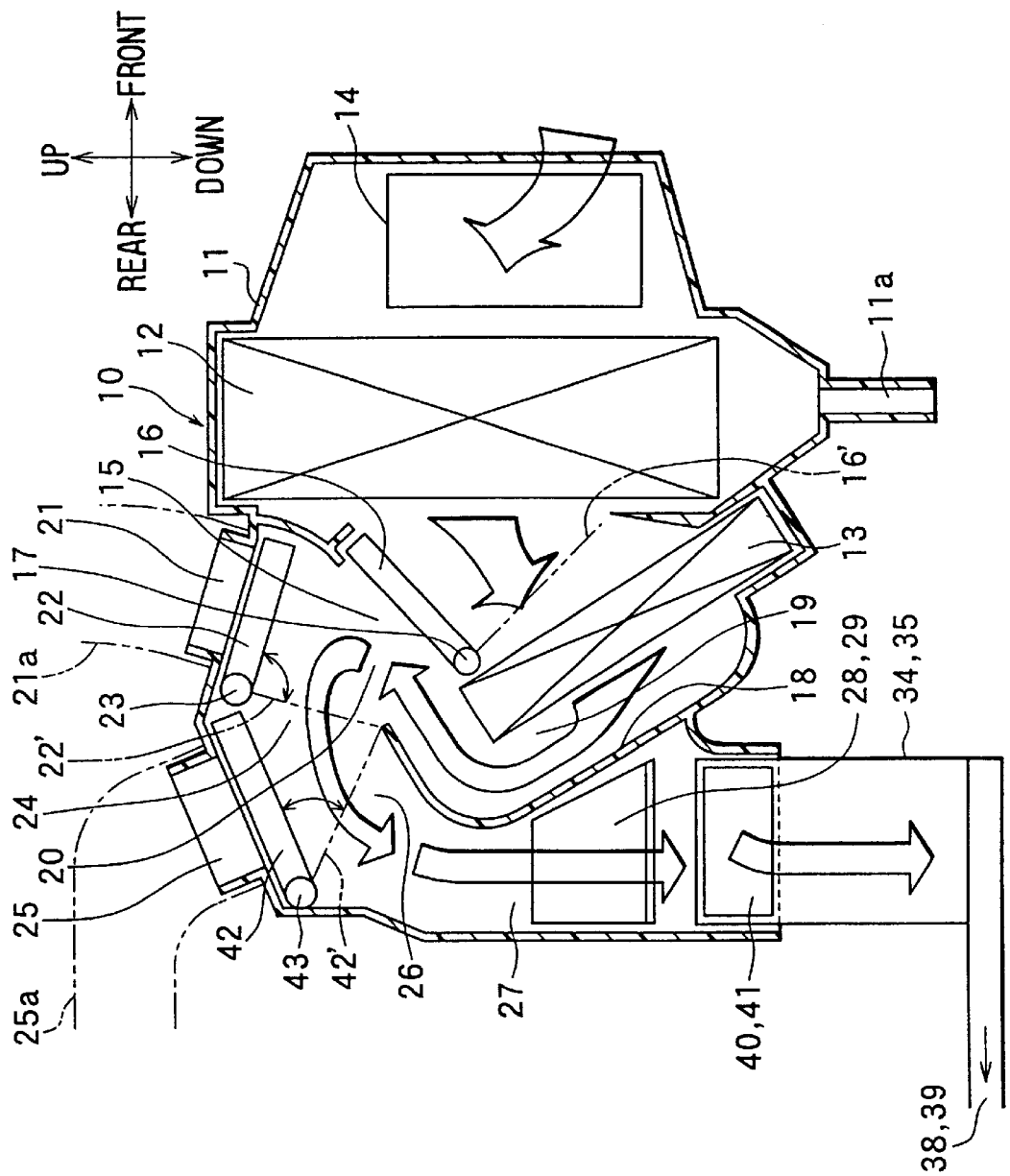
FIG. 1 is a schematic sectional view of an air conditioning unit of a vehicle air conditioner according to a preferred embodiment of the present invention.
Figure 2:
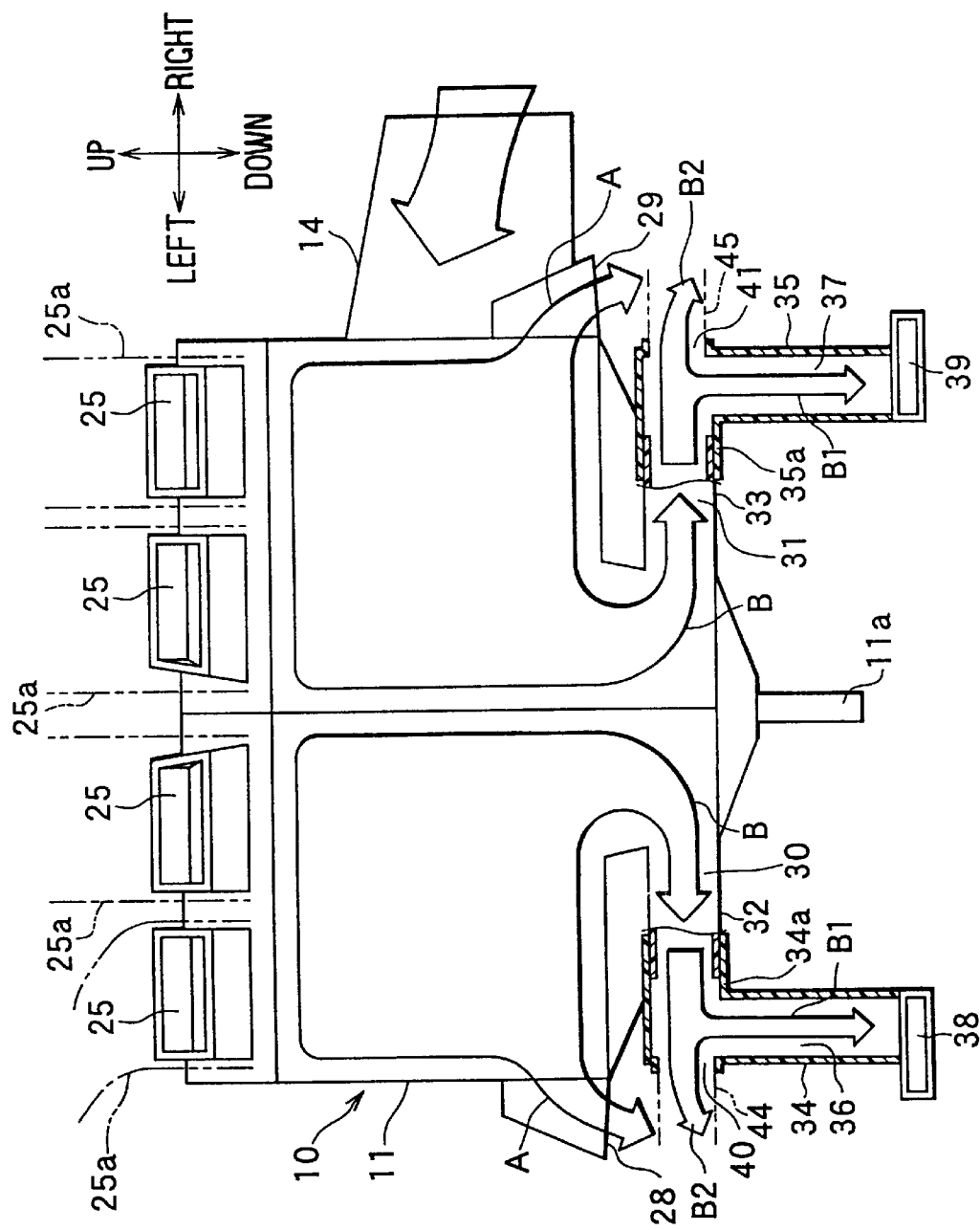
FIG. 2 is a front view of the air conditioning unit when being viewed from a vehicle rear side to a vehicle front side.

A ventilation system of a vehicle air conditioner includes a blower unit (not shown) and an air conditioning unit 10 shown in FIGS. 1 and 2. The air conditioning unit 10 is disposed in a passenger compartment under an instrument panel at an approximate center in a vehicle right-left direction. On the other hand, the blower unit is disposed in the passenger compartment under the instrument panel at a position shifted to a front-passenger's seat side (e.g., right side) from the air conditioning unit 10.

The blower unit includes an inside/outside air switching box for introducing and switching inside air (i.e., air inside the passenger compartment) and outside air (i.e., air outside the passenger compartment), and a blower for blowing air sucked through the inside/outside air switching box.

The air conditioning unit 10 has an air conditioning case 11 defining an air passage through which air blown by the blower unit flows into the passenger compartment. The air conditioning unit 10 further has an evaporator 12 of a refrigerant cycle and a heater core 13. Both the evaporator 12 and the heater core 13 are integrally disposed in the air conditioning case 11.

The air conditioning case 11 is made of resin which has an elasticity to some degrees and is superior in a strength, such as polypropylene. The air conditioning case 11 is composed of plural division case portions which are integrally connected by fastening means such as a metal spring clip and a screw, after the heat exchangers 12, 13 and components such as doors are accommodated therein, to construct the air conditioning unit 10.

The air conditioning unit 10 is disposed to correspond to the arrangement shown in FIGS. 1 and 2, relative to a vehicle front-rear direction, the vehicle right-left direction and a vehicle up-down direction. A connection duct 14 is formed at a most front side of the air conditioning case 11 to protrude toward the front-passenger's seat side. Therefore, air blown from the blower unit flows into the air conditioning unit 10 through the connection duct 14. That is, the connection duct 14 defines an air inlet of the air conditioning unit 10.

The evaporator 12 is disposed in the air conditioning case 11 at a position immediately after the connection duct 14. The evaporator 12 is disposed vertically in the air conditioning case 11 to be thinned in the vehicle front-rear direction and to cross an air passage within the air conditioning case 11. Therefore, air from the connection duct 14 flows into a front surface of the evaporator 12, extending in the vehicle up-down direction.

The evaporator 12 is a cooling heat exchanger, in which an evaporation latent heat of refrigerant of the refrigerant cycle is absorbed from air so that air passing therethrough is cooled. As shown in FIG. 1, a drain pipe 11a of condensed water is disposed in the air conditioning case 11 at a position under the evaporator 12.

A heater core 13 is disposed at a downstream air side (i.e., vehicle rear side) of the evaporator 12 to have a predetermined distance therebetween. The heater core 13 is disposed within the air conditioning case 11 at a lower side to be tilted toward the vehicle rear side relative to the vehicle up-down direction by a predetermined angle. The heater core 13 is a heating heat exchanger in which hot water (engine-cooling water) flows so that air having passed through the evaporator 12 is heated using hot water as a heating source.

A cool air bypass passage 15 through which air having passed through the evaporator 12 bypasses the heater core 13 is provided within the air conditioning case 11 at an upper side from the heater core 13. A plate-like air mixing door 16 is disposed between the heater core 13 and the evaporator 12 so that a ratio between an amount of warm air heated in the heater core 13 and an amount of cool air bypassing the heater core 13 is adjusted.

The air mixing door 16 is rotated in the vehicle up-down direction around a rotation shaft 17 disposed in a horizontal direction. The air mixing door 16 is used as a temperature adjustment unit for adjusting temperature of air blown into the passenger compartment by adjusting the air amount ratio. The solid line position of the air mixing door 16 in FIG. 1 indicates the maximum heating position at which the cool air bypass passage 15 is fully closed and an air passage of the heater core 13 is fully opened. The rotation shaft 17 is rotatably held in the air conditioning case 11. One end of the rotation shaft 17 protrudes to an outside of the air conditioning case 11, and is connected to an actuator mechanism using a servomotor or a manual operation mechanism through a link mechanism. Therefore, a rotation position of the air mixing door 16 is adjusted by the actuator mechanism or the manual operation mechanism.

A wall portion 18 extending in the vehicle up-down direction is formed integrally with the air conditioning case 11 to have a predetermined distance between the wall portion 18 and the heater core 13. Therefore, a warm air passage 19 extending from an immediately downstream side of the heater core 13 upwardly is defined by the wall portion 18. An air mixing portion 20 in which warm air from the warm air passage 19 and cool air from the cool air bypass passage 15 are mixed is provided at a downstream air side (upper side) of the warm air passage 19, upper than the heater core 13.

A defroster opening 21 is opened on an upper surface of the air conditioning case 11 at a position of a vehicle front side, adjacent to the air mixing portion 20. The defroster opening 21 is provided so that conditioned air from the air mixing portion 20 flows into the defroster opening 21. The defroster opening 21 is connected to a defroster air outlet through a defroster duct 21a so that conditioned air is blown toward an inner surface of a front windshield through the defroster air outlet.

The defroster opening 21 is opened and closed by a plate-like defroster door 22. The defroster door 22 is rotated by a rotation shaft 23 disposed approximately horizontally near the upper surface of the air conditioning case 11. When the defroster door 22 is operated to the chain line position 22', the defroster opening 21 is fully opened and a communication port 24 is closed.

The communication port 24 is a passage through which air from the air mixing portion 20 flows toward a face opening 25 and a common foot inlet 26 for the front seat and the rear seat. The face opening 25 and the foot inlet 26 are opened and closed by a plate-like foot/face switching door 42. The foot/face switching door 42 is rotated by a rotation shaft 43 disposed in the horizontal direction at a position proximate to the upper surface of the air conditioning case 11.

In the embodiment, the defroster door 22 and the foot/face switching door 42 are used as air outlet mode switching means. The rotation shafts 23, 43 of the doors 22, 42 are connected to an actuator mechanism such as a servomotor or a manual operation mechanism through a link mechanism, so that the operation positions of the doors 22, 42 are adjusted by the actuator mechanism or the manual operation mechanism.

The face opening 25 is opened in the upper surface of the air conditioning case 11 at a vehicle rear side position from the defroster opening 21. As shown in FIG. 2, the face opening 25 is provided at four positions in the vehicle right-left direction. The face opening 25 is connected to a face air outlet (not shown) provided at an upper side of the instrument panel through a face duct 25a so that conditioned air is blown from the face air outlet toward the upper body of a front seat passenger of the passenger compartment.

A foot passage 27 through which air from the foot inlet 26 flows is provided at a vehicle rear side relative to the wall portion 18 defining the warm air passage 19. As shown in FIG. 2, first front foot air outlets 28, 29 through which air from the foot passage 27 is blown toward the foot area of a passenger on the front seat are opened at lower sides in side surface portions of the air conditioning case 11 in the vehicle right-left direction. The first front foot air outlets 28, 29 are opened toward a lower side so that air is blown from the first front foot air outlets 28, 29 downwardly.

Rear foot passages 30, 31, through which a part of air from the foot passage 27 flows while being branched, are provided at a lower side of the first front foot air outlets 28, 29. The rear foot passages 30, 31 are defined by duct portions 32, 33 protruding toward outside in the vehicle right-left direction at positions near the bottom of the air conditioning case 11. Top ends of the duct portions 32, 33 are connected to connection portions 34a, 35a of rear foot ducts 34, 35, respectively.

The rear foot ducts 34, 35 define therein rear foot passages 36, 37, respectively, through which air is blown toward the rear foot area of the passenger compartment. Therefore, a part of air from the foot passage 27 flows into the rear foot passages 36, 37 through the rear foot passages 30, 31. At top ends of the rear foot ducts 34, 35, rear foot air outlets 38, 39 are opened, respectively, so that air is blown toward the foot area of a passenger on the rear seat of the passenger compartment from the rear foot air outlets 38, 39.

Further, second front foot air outlets 40, 41 for blowing air toward the foot area of the passenger on the front seat are opened at the connection portions 34a, 35a of the rear foot ducts 34, 35. As shown in FIG. 2, the second front foot air outlets 40, 41 are provided at positions immediately lower from the front foot air outlets 28, 29 to be opened toward outside in the vehicle right-left direction.

Next, operation of the vehicle air conditioner according to the embodiment will be now described. By selectively setting operation positions of the defroster door 22 and the foot/face switching door 42, an air outlet mode described below can be set.

(1) Foot Mode

When the foot mode is set, the defroster door 22 is rotated from the solid line position in FIG. 1 slightly in the clockwise direction, and the defroster opening 21 is slightly opened. On the other hand, the foot/face switching door 42 is operated to the solid line position in FIG. 1, so that the face opening 25 is fully closed and the foot inlet 26 is fully opened.

During the foot mode, air blown from the blower unit is heated in the heater core 13, and passes through the warm air passage 19. A part of warm air from the warm air passage 19 flows into the defroster opening 21, and is blown toward an inner surface of the windshield from the defroster air outlet through the defroster duct 21 to defrost the windshield. Simultaneously, the other part of warm air heated in the heater core 13 flows into the foot passage 27 from the foot inlet 26. Warm air flowing into the foot passage 27 is branched into an air flow A toward the first front foot air outlets 28, 29 and an air flow B toward the rear foot passages 30, 31, as shown in FIG. 2. The air flow B in the rear foot passages 30, 31 is further branched at the connection portions 34a, 35a of the rear foot ducts 34, 35 into an air flow B1 toward the rear foot air outlets 38, 39 and an air flow B2 toward the second front foot air outlets 40, 41.

Accordingly, warm air from the first front foot air outlets 28, 29 and warm air from the second front foot air outlets 40, 41 are simultaneously blown toward the foot area of the passenger on the front seat, and heating operation is performed for the passenger on the front seat of the passenger compartment. On the other hand, warm air is blown from the rear foot air outlets 38, 39 toward the foot area of a passenger on the rear seat to perform heating operation for the passenger on the rear seat of the passenger compartment.

According to the embodiment, the warm air flow B of the rear foot passages 30, 31 is branched into the air flow B1 toward the rear foot area and the air flow B2 toward the front foot area so that warm air from the rear foot passages 30, 31 is blown toward the front and rear lower areas of the passenger compartment. Therefore, by adjusting the opening areas of the second front foot air outlets 40, 41, a ratio between an air amount blown toward the front foot area and an air amount blown toward the rear foot area can be readily adjusted. For example, a decrease ratio of air blown toward the rear foot area, that is, an increase ratio of air blown toward the front foot area is readily controlled by adjusting the opening areas of the second front foot air outlets 40, 41. The opening areas of the second front foot air outlets 40, 41 may be changed by an adjustment unit such as grilles, guide plates.

Further, when the opening areas of the second front foot air outlets 40, 41 are changed, only the air amount blown toward the rear foot area is changed, but the air flow resistance in the rear foot passages 30, 31, 36, 37 is not changed. Therefore, a total air amount blown toward the front foot area and the rear foot area is not reduced, and heating capacity for the passenger compartment is maintained.

Generally, it is difficult to increase the opening areas of the front foot air outlets 28, 29 from a vehicle construction. However, any a vehicle component is not provided under the first front foot air outlets because warm air is blown from the first front foot air outlets 28, 29 downwardly. Therefore, the second front foot air outlets 40, 41 can be readily provided under the first front foot air outlets 28, 29.

In this embodiment, suitable supplementary air ducts 44, 45 may be connected to the second front foot air outlets 40, 41, as shown by the chain line in FIG. 2. In this case, warm air from the second front foot air outlets 40, 41 can be introduced into at a position different from a position into which warm air from the first front foot air outlets 28, 29 is introduced.

During the foot mode, when the air mixing door 16 is operated to the solid line position in FIG. 1, the cool air bypass passage 15 is fully closed and the air passage of the heater core 13 is fully opened, and therefore, the maximum heating capacity is obtained. On the other hand, when the air mixing door 16 is rotated at a position between the chain line position 16' in FIG. 1 and the solid line position in FIG. 1, warm air from the heater core 13 and cool air from the cool air bypass passage 15 are mixed, and temperature of air blown into the passenger compartment is adjusted.

(2) Foot/Defroster Mode

During the foot/defroster mode, the operation position of the defroster door 22 is moved toward the side of the chain line position 22' as compared with the foot mode, so that the opening degree of the defroster opening 21 is increased and air amount blown into the defroster opening 21 is increased.

The other parts of the foot/defroster mode are similar to those of the foot mode.

(3) Face Mode

When the face mode is set, the defroster door 22 is operated to the solid line position in FIG. 1 so that the defroster opening 21 is closed and the communication port 24 is fully opened. Further, the foot/face switching door 42 is operated to the chain line position 42' in FIG. 1 so that the foot inlet 26 is fully closed and the face opening 25 is fully opened. Thus, cool air having been cooled in the evaporator is blown into the face opening 25, and is blown toward the upper body of a front passenger from the face air outlet through the face duct 25a. During the face mode, the air mixing door 16 is operated to the chain line position (maximum cooling position) 16' or at a position near the chain line position 16', so that the temperature of air blown into the front face area of the passenger compartment is decreased.

(4) Bi-Level Mode

When the bi-level mode is set, the defroster door 22 is operated to the solid line position in FIG. 1 so that the defroster opening 21 is fully closed and the communication port 24 is fully opened. Further, the foot/face switching door 42 is operated at a position between the solid line position in FIG. 1 and the chain line position 42' in FIG. 1 so that both the face opening 25 and the foot inlet 26 are opened. Thus, conditioned air is simultaneously blown toward the upper body of the front passenger, and toward the foot areas of the front passenger and the rear passenger.

(5) Defroster Mode

When the defroster mode is set, the defroster door 22 is operated to the chain line position 22' to close the communication port 24 and to fully open the defroster opening 21. Therefore, an entire air amount blown from the blower unit flows into the defroster opening 21, and is blown toward the inner surface of the front windshield from a defroster air outlet. Thus, during the defroster mode, defrosting performance of the front windshield is improved.

Although the present invention has been fully described in connection with the preferred embodiment thereof with reference to the accompanying drawings, it is to be noted that various changes and modifications will become apparent to those skilled in the art.

For example, in the abode-described embodiment, the present invention is applied to a vehicle air conditioner without having a rear face air outlet. However, the present invention may be applied to a vehicle air conditioner having the rear face air outlet.

Such changes and modifications are to be understood as being within the scope of the present invention as defined by the appended claims.

What is claimed is:

1. An air conditioner for a vehicle having a passenger compartment, said air conditioner comprising:
   an air conditioning case defining an air passage through which air flows into the passenger compartment; and
   a heating heat exchanger disposed in said air conditioning case, for heating air in said air passage, wherein:
   said air passage has an upstream foot passage and a downstream foot passage, said downstream foot passage communicating with said upstream foot passage at a downstream side of said upstream foot passage;
   said air conditioning case has:
      a first front foot air outlet communicating with said upstream foot passage, from which air is blown toward a front lower side of the passenger compartment,
      a second front foot air outlet communicating with said downstream foot passage, said second front foot air outlet being positioned adjacent to said first front foot air outlet and from which air is blown toward the front lower side of the passenger compartment, said second front foot air outlet being positioned relative to said first front foot air outlet such that said second front foot air outlet and said first front foot air outlet are at least partially vertically aligned with each other, and
      a rear foot air outlet being provided at a most downstream position of said downstream foot passage from which air is blown toward a rear lower side of the passenger compartment; wherein:
   air always flows from said second front foot air outlet when air flows from said first front foot air outlet.

2. The air conditioner according to claim 1, wherein:
   said air conditioning case has a rear foot duct defining a rear foot passage in said downstream foot passage for blowing air toward the rear lower side of the passenger compartment;
   said rear foot duct has a connection portion adjacent to said first front foot air outlet at the most upstream air side of said rear foot passage; and
   said second front foot air outlet is provided in said connection portion.

3. The air conditioner according to claim 2, wherein:
   said rear foot duct includes a first duct portion extending in an opening direction of said second front foot air outlet, a second duct portion extending downwardly from a downstream end of said first duct portion, and a third duct portion extending from a downstream end of said second duct portion toward the rear of the vehicle.

4. The air conditioner according to claim 3, wherein said second front foot air outlet opens generally horizontally in the connection portion between said first duct portion and said second duct portion.

5. The air conditioner according to claim 1, wherein said second front foot air outlet is provided at a lower side of said first front foot air outlet in a vehicle up-down direction.

6. The air conditioner according to claim 5, wherein:
   said first front foot air outlet opens downwardly; and
   said second front foot air outlet opens so that air is blown from said second front foot air outlet generally horizontally.

7. The air conditioner according to claim 1, wherein said first front foot air outlet, said downstream foot passage, said rear foot air outlet and said second front foot air outlet are provided at a first side and at a second side of said air conditioning case in a vehicle right-left direction, respectively.

8. The air conditioner according to claim 1, further comprising:
   an adjustment unit which adjusts an opening area of said second front foot air outlet in such a manner that a ratio between an amount of air blown toward the front lower side and an amount of air blown toward the rear lower side is adjusted.

9. The air conditioner according to claim 1, wherein said second front foot air outlet communicates with said downstream foot passage through a duct.

10. The air conditioner according to claim 1, wherein:
    the air flow from said upstream foot passage is branched into a first flow toward said first front foot air outlet and a second flow toward said downstream foot passage; and
    the second flow of air is further branched into a third flow toward said second front foot air outlet and a fourth flow toward said rear foot air outlet.

11. The air conditioner according to claim 1, wherein:
    said first front foot air outlet opens toward a first direction; and
    said second front foot air outlet opens toward a second direction which intersects the first direction.

12. An air conditioner for a vehicle having a passenger compartment, said air conditioner comprising:
    an air conditioning case defining an air passage through which air flows into the passenger compartment; and
    a heating heat exchanger disposed in said air conditioning case for heating air in said air passage; wherein:
    said air passage has an upstream foot passage and a downstream foot passage, said downstream foot passage communicating with said upstream foot passage at a downstream side of said upstream foot passage;
    said air conditioning case has:
       a first front foot air outlet communicating with said upstream foot passage, from which air is blown toward a front lower side of the passenger compartment,
       a second front foot air outlet communicating with said downstream foot passage, said second front foot air outlet being positioned adjacent to said first front foot air outlet and from which air is blown toward the front lower side of the passenger compartment, said second front foot air outlet being positioned relative to of said first front foot air outlet such that said second front foot air outlet and said first front foot outlet are at least partially vertically aligned, and a rear foot air outlet being provided at a most downstream position of said downstream foot passage from which air is blown toward a rear lower side of the passenger compartment; wherein:

said downstream foot passage has a rear foot passage for blowing air toward the rear lower side of the passenger compartment;

said rear foot air outlet is at a most downstream air end of said rear foot passage; and said second front foot air outlet is provided at a most upstream air position of said rear foot passage such that air in said downstream foot passage is branched into an air flow flowing through said second front foot air outlet and an air flow flowing through said rear foot passage.

13. The air conditioner according to claim 12, wherein said second front foot air outlet is provided at a lower side of said first front foot air outlet in a vehicle up-down direction.

14. The air conditioner according to claim 12, wherein:

said first front foot air outlet opens toward a first direction; and said second front foot air outlet opens toward a second direction which intersects the first direction.

* * * * *